United States Patent
Kawasumi et al.

(10) Patent No.: US 11,879,717 B2
(45) Date of Patent: Jan. 23, 2024

(54) MEASURING APPARATUS

(71) Applicant: DISCO CORPORATION, Tokyo (JP)

(72) Inventors: Takehito Kawasumi, Tokyo (JP);
Nobuyuki Kimura, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 17/645,089

(22) Filed: Dec. 20, 2021

(65) Prior Publication Data

US 2022/0236049 A1 Jul. 28, 2022

(30) Foreign Application Priority Data

Jan. 22, 2021 (JP) .................................. 2021-008496

(51) Int. Cl.
*G01B 11/28* (2006.01)
*G01B 11/06* (2006.01)

(52) U.S. Cl.
CPC ................................ *G01B 11/0608* (2013.01)

(58) Field of Classification Search
CPC . G01B 11/06; G01B 11/0608; G01B 11/0616; G01B 11/026; G01B 11/22;
(Continued)

(56) References Cited

U.S. PATENT DOCUMENTS

| 2014/0368830 A1* | 12/2014 | Michelt | G01B 11/0608 |
| | | | 356/485 |
| 2016/0018213 A1* | 1/2016 | Miki | G01B 11/06 |
| | | | 356/632 |

(Continued)

FOREIGN PATENT DOCUMENTS

| DE | 102011055735 A1 * | 5/2013 | ............. G01B 11/06 |
| EP | 3176538 B1 * | 4/2019 | ......... G01B 11/0608 |

(Continued)

OTHER PUBLICATIONS

Matthias Hillenbrand, Lucia Lorenz, Roman Kleindienst, Adrian Grewe, and Stefan Sinzinger, "Spectrally multiplexed chromatic confocal multipoint sensing," Opt. Lett. 38, 4694-4697 (2013) (Year: 2013).*

(Continued)

*Primary Examiner* — Uzma Alam
*Assistant Examiner* — Jonathon Cook
(74) *Attorney, Agent, or Firm* — GREER BURNS & CRAIN, LTD.

(57) ABSTRACT

A measuring apparatus includes a holding unit and a measuring unit. The measuring unit includes a first optical fiber for transmitting light emitted from a light source, a branching member for branching the light transmitted through the first optical fiber to at least two measuring optical fibers, a plurality of heads including respective beam condensers for converging the light branched by the branching member onto a measurand, a shutter device for shifting timings of application of the light applied from the heads to the measurand, a second optical fiber branched from the branching member and transmitting returning light reflected from the measurand, a spectroscopic unit having a light detector for detecting the returning light, and a controller for controlling the shutter device to control the timings of application of the light applied from the heads to the measurand and controlling the light detector to detect the returning light individually.

14 Claims, 8 Drawing Sheets

(58) Field of Classification Search
CPC ....... G01B 11/24; G01B 11/30; G01B 11/303; G01B 11/306; G01J 3/0216
See application file for complete search history.

(56) References Cited

U.S. PATENT DOCUMENTS

| | | | |
|---|---|---|---|
| 2018/0113027 A1* | 4/2018 | Kubo | G01J 3/0208 |
| 2018/0356208 A1* | 12/2018 | Kuga | G02B 21/0064 |
| 2018/0356284 A1* | 12/2018 | Takei | G01J 3/024 |
| 2019/0360796 A1* | 11/2019 | Fujimoto | G01B 11/272 |

FOREIGN PATENT DOCUMENTS

| | | | | |
|---|---|---|---|---|
| JP | 2008170366 A | 7/2008 | | |
| JP | 2011122894 A | 6/2011 | | |
| JP | 2014178287 A | 9/2014 | | |
| WO | WO-2014141535 A1 * | 9/2014 | | G01B 11/00 |
| WO | 2015199054 A1 | 12/2015 | | |

OTHER PUBLICATIONS

Cacace, L. A. (2009). An optical distance sensor : tilt robust differential confocal measurement with mm range and nm uncertainty. [Phd Thesis 1 (Research TU/e / Graduation TU/e), Mechanical Engineering]. Technische Universiteit Eindhoven. https://doi.org/10.6100/IR653288 (Year: 2009).*

* cited by examiner

MEASURING APPARATUS

BACKGROUND OF THE INVENTION

Field of the Invention

The present invention relates to a measuring apparatus having a holding unit for holding a measurand, i.e., an object to be measured, and a measuring unit for measuring a height of an upper surface of the measurand held by the holding unit or a thickness of the measurand.

Description of the Related Art

Semiconductor wafers with devices formed on their face side have their reverse side ground by a grinding apparatus so that they are thinned down to a predetermined thickness. Then, each of the semiconductor wafers is divided into individual device chips having the respective devices by a processing apparatus such as a cutting apparatus or a laser processing apparatus. For processing such a semiconductor wafer as a workpiece on a laser processing apparatus, it is necessary to position a focused spot of a pulsed laser beam having a wavelength transmittable through the workpiece at a predetermined depth in the workpiece from the upper surface of the workpiece. For thus positioning the focused spot of the pulsed laser beam, a height of the upper surface of the workpiece is measured by a measuring apparatus (see, for example, Japanese Patent Laid-Open No. 2008-170366 and Japanese Patent Laid-Open No. 2011-122894).

The measuring apparatus has a light source for emitting light in a predetermined wavelength band. Light emitted from the light source is guided through an optical fiber to a head that includes a lens having an axial chromatic aberration. The light in the predetermined wavelength band is diffracted by the lens due to the axial chromatic aberration into light rays that are converged at different positions on an optical axis depending on the wavelengths of the light rays. Of the light rays applied from the head to the measurand, the light ray focused on the upper surface of the measurand and having a predetermined wavelength is reflected by the measurand and mainly introduced through the lens into an optical fiber. The reflected light ray is applied through the optical fiber to a spectroscope or the like, which specifies the wavelength of the light ray.

Since the lens has predetermined focal lengths for the respective wavelengths, a distance from the head to the upper surface of the measurand can be determined on the basis of the specified wavelength of the reflected light ray. Accordingly, the measuring apparatus can measure the height of the upper surface of the measurand and the thickness of the measurand (see, for example, PCT Patent Publication No. WO 2015/199054). The measuring apparatus disclosed in PCT Patent Publication No. WO 2015/199054 has a light source, a spectroscope, a head, and a 1×2 fiber optic coupler. The light source is connected to a first port positioned on one side of a branching member of the coupler, and the spectroscope is connected to a second port positioned on the same one side.

Moreover, the head is connected to a third port positioned on the other side of the branching member of the coupler. With this configuration, as the head can only measure one point on the measurand in one measuring session, the measuring process is inefficient. In view of the difficulty, there has been proposed a technology in which an optical fiber including a 2×2 fiber optic coupler is used to connect a light source, a spectroscope, and two heads for measuring two points on the measurand. However, the proposed technology is problematic in that since reflected light rays received by the respective heads are simultaneously detected by a light detector via the spectroscope, the light detector is unable to establish a correspondence between the reflected light rays from the heads and detected light signals.

To solve the above problem, there has been proposed a measuring apparatus that measures different wavelength bands with respective heads by providing filters that pass respective light rays in the different wavelength bands for the respective heads (see, for example, Japanese Patent Laid-Open No. 2014-178287). However, as the number of divided wavelength bands increases due to an increase in the number of heads, the measurement wavelength band per head, i.e., the measurement range, is reduced.

SUMMARY OF THE INVENTION

The present invention has been made in view of the above drawback. It is an object of the present invention to provide a measuring apparatus for measuring the height of the upper surface of a measurand, etc. without reducing a measurement wavelength band per head and at two or more points thereon using two or more heads.

In accordance with an aspect of the present invention, there is provided a measuring apparatus including a holding unit for holding a measurand and a measuring unit for measuring a height of an upper surface of the measurand held by the holding unit or a thickness of the measurand held by the holding unit. The measuring unit includes a light source for emitting light in a predetermined wavelength band, a first optical fiber for transmitting the light emitted from the light source, a branching member for branching the light transmitted by the first optical fiber to at least two measuring optical fibers, a head unit having a plurality of heads including respective beam condensers for converging the light branched by the branching member onto the measurand, a shutter device for shifting the timings of application of the light from the heads to the measurand, a second optical fiber branched from the branching member, for transmitting returning light reflected from the measurand and transmitted through the measuring optical fibers, a spectroscopic unit having a light detector for detecting the returning light transmitted through the second optical fiber, and a controller for controlling operation of the shutter device to control the timings of application of the light from the heads to the measurand and controlling the light detector to detect the returning light from the heads individually.

Preferably, the light detector includes a two-dimensional sensor.

Preferably, the measuring apparatus further includes an additional branching member disposed between the first optical fiber and the branching member, a second branching member for branching light from the additional branching member to at least two different measuring optical fibers, a second head unit having a plurality of second heads including respective beam condensers for converging the light branched by the second branching member onto the measurand, a second shutter device for shifting timings of application of the light from the second heads to the measurand, a fourth optical fiber branched from the second branching member differently from a third optical fiber that interconnects the additional branching member and the second branching member, for transmitting the returning light reflected by the measurand and transmitted through the measuring optical fibers, and a second spectroscopic unit having a second light detector for detecting the returning light transmitted through the fourth optical fiber. The controller controls operation of the second shutter device to control the timings of application of the light from the second heads to the measurand and controlling the second light detector to detect the returning light from the second heads individually.

Preferably, the measuring apparatus further includes an additional branching member disposed between the first optical fiber and the branching member, a second branching member for branching light from the additional branching member to at least two different measuring optical fibers, a second head unit having a plurality of second heads including respective beam condensers for converging the light branched by the second branching member onto the measurand, a second shutter device controllable in operation by the controller, for shifting timings of application of the light from the second heads to the measurand, and a fourth optical fiber branched from the second branching member with respect to a third optical fiber that interconnects the additional branching member and the second branching member, for transmitting the returning light reflected by the measurand and transmitted through the measuring optical fibers. The returning light transmitted through the second optical fiber and the fourth optical fiber is detected by the light detector, the light detector has a two-dimensional sensor, and the two-dimensional sensor detects the returning light transmitted through the second optical fiber and the returning light transmitted through the fourth optical fiber at different positions, thereby separating the returning light transmitted through the second optical fiber and the returning light transmitted through the fourth optical fiber from each other.

In accordance with another aspect of the present invention, there is provided a measuring apparatus including a holding unit for holding a measurand and a measuring unit for measuring a height of an upper surface of the measurand held by the holding unit or a thickness of the measurand held by the holding unit. The measuring unit includes a light source for emitting light in a predetermined wavelength band, a first optical fiber for transmitting the light emitted from the light source, a light-source-side branching member for branching the light transmitted by the first optical fiber to at least two rays of light, a plurality of couplers for transmitting rays of light branched from the light-source-side branching member to respective measuring optical fibers, a head unit having a plurality of heads including respective beam condensers for converging the rays of light transmitted through the measuring optical fibers onto the measurand, a plurality of spectroscopic-unit-side optical fibers branched from the couplers, for transmitting returning light reflected from the measurand and transmitted through the measuring optical fibers, and a plurality of spectroscopic units associated respectively with the spectroscopic-unit-side optical fibers and having respective light detectors for detecting the returning light transmitted through the spectroscopic-unit-side optical fibers, respectively.

Preferably, each of the couplers includes an optical circulator.

The measuring apparatus according to the aspect of the present invention includes the shutter device that shifts the timings of application of the light from the heads to the measurand. The measuring apparatus also includes the controller that controls operation of the shutter device. The shutter device operates to allow the light detector to detect individually the light applied from the heads to the measurand and reflected from the measurand. The height of an upper surface of the measurand, etc. can thus be measured without reducing a measurement wavelength band per head and at multiple points, i.e., two or more points, on the upper surface of the measurand using the two or more heads.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Preferred embodiments of the present invention will be described hereinbelow with reference to the accompanying drawings.

First Embodiment

Figure 1:
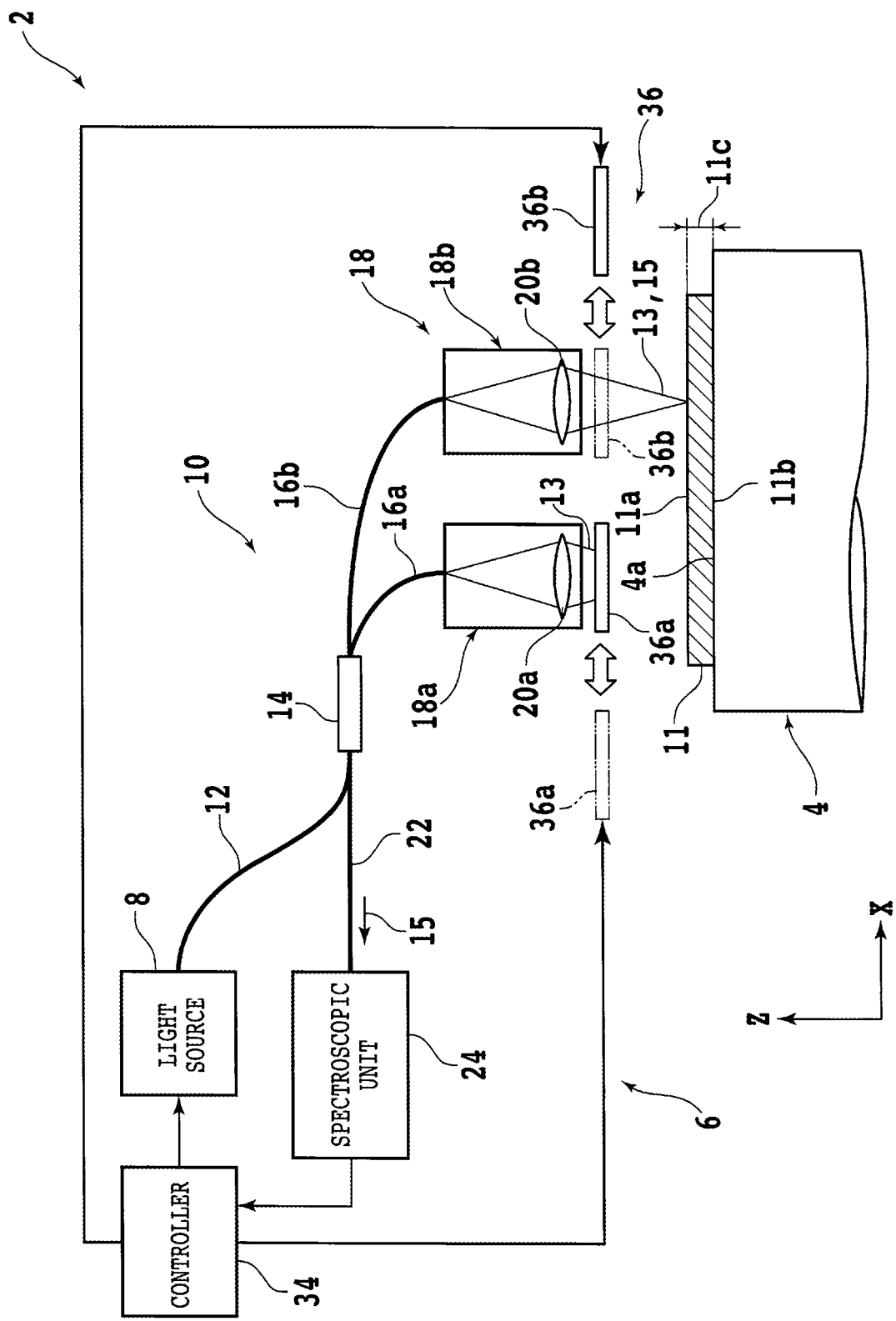
FIG. 1 is a schematic view of a measuring apparatus according to a first embodiment of the present invention.

FIG. 1 schematically illustrates a measuring apparatus 2 according to a first embodiment of the present invention. In FIG. 1, some of components of the measuring apparatus 2 are illustrated in functional block form. Z-axis directions indicated in FIG. 1 represent vertical directions, and X-axis directions and Y-axis directions, not illustrated, extend perpendicularly to the Z-axis directions and represent horizontal directions. The measuring apparatus 2 is incorporated in a processing apparatus, such as a grinding apparatus or a polishing apparatus, where it is necessary to measure a height of an upper surface 11a of a measurand 11 or a thickness 11c of the measurand 11, i.e., an object to be measured, for example. However, the measuring apparatus 2 may not necessarily be required to be ancillary to the processing apparatus but may be independent of the processing apparatus.

The measuring apparatus 2 according to the present embodiment has a chuck table 4, i.e., a holding unit. The chuck table 4 has a lower portion coupled to a rotary actuator, not illustrated, such as an electric motor for rotating the chuck table 4 about its own central axis in a predetermined direction. The chuck table 4 has a disk-shaped frame body having a fluid channel, not illustrated, defined in a lower portion thereof for applying therethrough a negative pressure generated by a suction source, not illustrated, such as an ejector to a disk-shaped porous plate, not illustrated.

The porous plate, not illustrated, is securely fitted in a disk-shaped recess defined in an upper portion of the frame body. The upper surface of the porous plate and the upper surface of the frame body lie substantially flush with each other, jointly making up a substantially flat holding surface 4a. The holding surface 4a holds under suction thereon the measurand 11, i.e., a workpiece, to be processed by the processing apparatus. The measurand 11 includes a silicon wafer, for example, and has a lower surface 11b held under suction on the holding surface 4a with a dicing tape, not illustrated, of resin interposed therebetween. The measurand has an upper surface 11a opposite the lower surface 11b. When the measurand is held on the holding surface 4a, the upper surface 11a is exposed upwardly. The upper surface 11a is irradiated with measuring light 13 from each of heads 18a and 18b of a measuring unit 6 to be described in detail later.

The measuring unit 6 has a light source 8. According to the present embodiment, the light source 8 includes a stimulating light source, not illustrated. The stimulating light source includes, for example, a laser diode (LD) for emitting stimulating light that includes blue light having a wavelength $\lambda=450$ nm, for example. The stimulating light is applied through an optical system including a lens, a prism, etc. to a phosphor. The phosphor includes a YAG:Ce phosphor, e.g., $(Y,Gd)_3Al_5O_{12}:Ce$, for example. The phosphor absorbs the simulating light and emits light in a predetermined wavelength band (for example, 500 nm to 700 nm) that includes light in green, yellow, red, and so on. The light emitted from the phosphor travels through a condensing lens, not illustrated, of the light source 8 and is converged onto an end of a first optical fiber 12 that acts as a first port of a 2×2 fiber optic coupler 10, from which the light is transmitted through the first optical fiber 12 to a branching member 14.

The fiber optic coupler 10 includes two optical fibers having respective portions fused and stretched, for example. Two measuring optical fibers 16a and 16b that act as third and fourth ports, respectively, of the fiber optic coupler 10 are connected to a side of the branching member 14 that is opposite the first optical fiber 12. The light in the predetermined wavelength band from the light source 8 is branched from the branching member 14 into the measuring optical fibers 16a and 16b at a ratio of 50 to 50, for example.

The measuring optical fiber 16a is connected to the head 18a. The head 18a includes a beam condenser 20a therein. According to the present embodiment, the beam condenser 20a includes a diffractive optical element and a condensing lens. Because of an axial chromatic aberration of the beam condenser 20a, a vertical position of a converged spot of the light that has passed through the beam condenser 20a varies depending on its wavelength. Specifically, the longer the wavelength of the light is, the closer the converged spot of the light is positioned to the beam condenser 20a, and the shorter the wavelength of the light is, the farther the converged spot of the light is positioned from the beam condenser 20a. Note that the beam condenser 20a may have a chromatic aberration lens instead of the diffractive optical element and the condensing lens. According to such an alternative, the longer the wavelength of the light is, the farther the converged spot of the light is positioned from the beam condenser 20a, and the shorter the wavelength of the light is, the closer the converged spot of the light is positioned to the beam condenser 20a.

Part of the measuring light 13 applied from the beam condenser 20a to the measurand 11 is reflected by the upper surface 11a thereof and travels as returning light 15 back through the beam condenser 20a to the measuring optical fiber 16a. However, while the wavelength component that has been converged on the upper surface 11a mainly passes into the measuring optical fiber 16a, those wavelength components that have not been converged on the upper surface 11a are essentially blocked by the measuring optical fiber 16a. The head 18a and the measuring optical fiber 16a thus provide a confocal optical system. Incidentally, insofar as the head 18a provides a confocal optical system, the head 18a is not limited to the configuration illustrated in FIG. 1 but may be of other configurations. For example, an additional condensing lens may be positioned between the beam condenser 20a and the measuring optical fiber 16a.

The measuring optical fiber 16b is connected to the head 18b. Note that the head 18a and the head 18b jointly make up a first head unit 18. The head 18b also includes a beam condenser 20b, and the head 18b and the measuring optical fiber 16b provide a confocal optical system. Part of the measuring light 13 applied from the beam condenser 20b to the measurand 11 is also reflected by the upper surface 11a thereof and travels as returning light 15 back through the beam condenser 20b to the measuring optical fiber 16b.

The returning light 15 reflected by the upper surface 11a and passing through the measuring optical fiber 16a or 16b is transmitted via the branching member 14 to a second optical fiber 22 that acts as a second port of the 2×2 fiber optic coupler 10. A spectroscopic unit 24 is connected to an end of the second optical fiber 22. The spectroscopic unit 24 has a collimator lens 26 (see FIG. 2) that turns the returning light 15 into substantially parallel-ray light.

Figure 2:
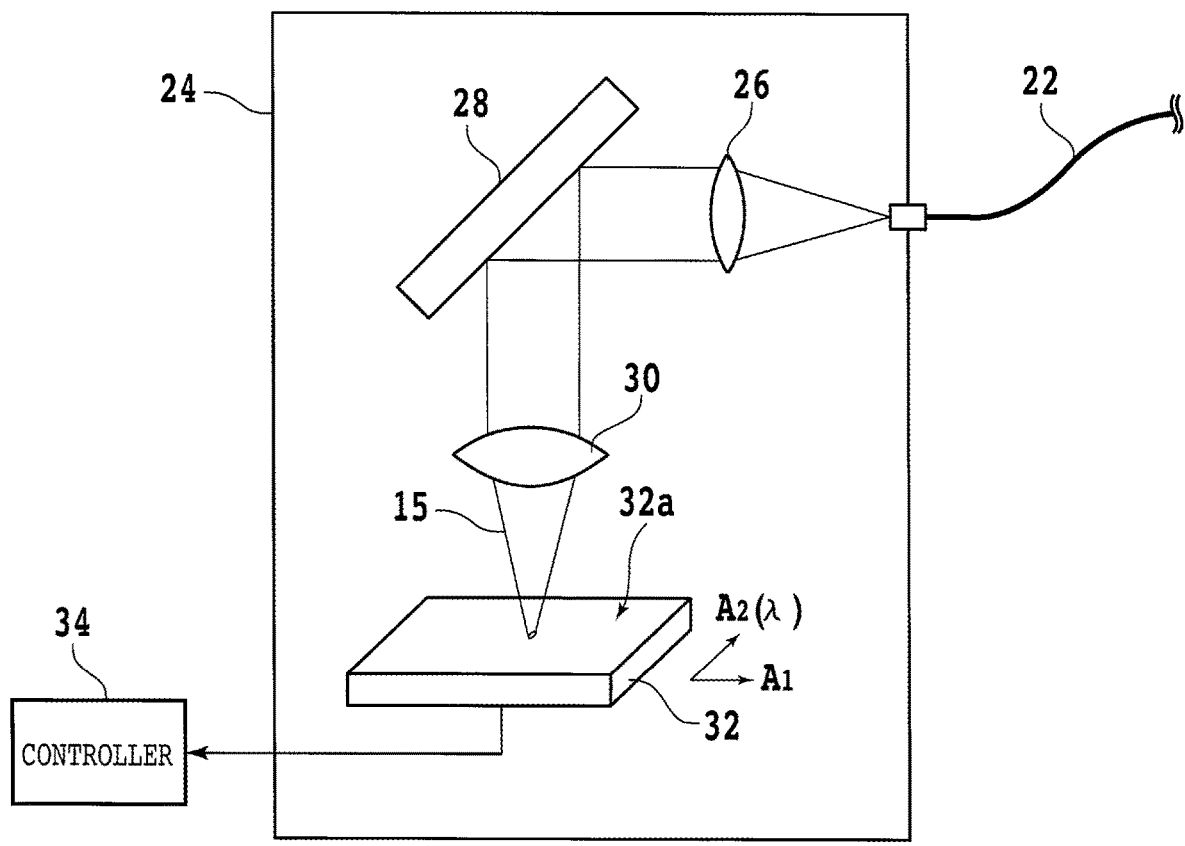
FIG. 2 is a schematic view of a spectroscopic unit of the measuring apparatus.

FIG. 2 schematically illustrates the spectroscopic unit 24. As illustrated in FIG. 2, the returning light 15 that has passed through the collimator lens 26 is reflected by a diffraction grating 28 and detected by a light detector 32 via a condensing lens 30. The light detector 32 includes a complementary metal-oxide-semiconductor (CMOS) or a charge-coupled-device (CCD) image sensor, i.e., a two-dimensional sensor, having a two-dimensional matrix of light detecting elements.

The light detector 32 includes a rectangular light detecting area 32a having two sides that are substantially parallel to a first direction $A_1$ and two sides that are substantially parallel to a second direction $A_2$ extending perpendicularly to the first direction $A_1$. The returning light 15 is detected by the light detector 32 at different positions in the second direction $A_2$ on the light detecting area 32a depending on the wavelength thereof. A detected light signal generated by the light detecting area 32a is input to a controller 34 that controls the measuring apparatus 2 (see FIGS. 1 and 2). The controller 34 specifies a position of the light detecting element where light intensity in the second direction $A_2$ is maximum, thereby specifying a peak wavelength of the returning light 15. Since the second direction $A_2$ and the wavelength ($\lambda$) are associated with each other, the second direction $A_2$ is denoted by $A_2(\lambda)$ in FIG. 2.

The controller 34 includes, for example, a computer including a processor such as a central processing unit (CPU), a main storage device such as a dynamic random access memory (DRAM), and an auxiliary storage device such as a memory or a hard disk drive. The controller 34 has its functions performed by operating the processor, etc. according to software or programs stored in the auxiliary storage device. The controller 34 controls operation of a shutter device 36 in addition to the light source 8 and the spectroscopic unit 24. The shutter device 36 has a shutter 36a disposed between the head 18a and the holding surface 4a and a shutter 36b disposed between the head 18b and the holding surface 4b.

According to the present embodiment, each of the shutters 36a and 36b includes a focal plane shutter that is slidable along the X-axis directions. However, each of the shutters 36a and 36b may be slidable along predetermined directions other than the X-axis directions in an X-Y plane that is defined by the X-axis directions and the Y-axis directions. Note that each of the shutters 36a and 36b may include a mechanical shutter such as a lens shutter or a shutter incorporating a transmissive liquid crystal that selectively transmits and blocks light when electrically driven.

The controller 34 controls the shutters 36a and 36b such that when one of the shutters 36a and 36b is open, the other of the shutters 36a and 36b is closed, thereby shifting timings of the application of the measuring light 13 from the heads 18a and 18b to the upper surface 11a of the measurand 11. The returning light 15 from the heads 18a and 18b is thus detected by the light detector 32 individually, i.e., at different timings.

Figure 3:
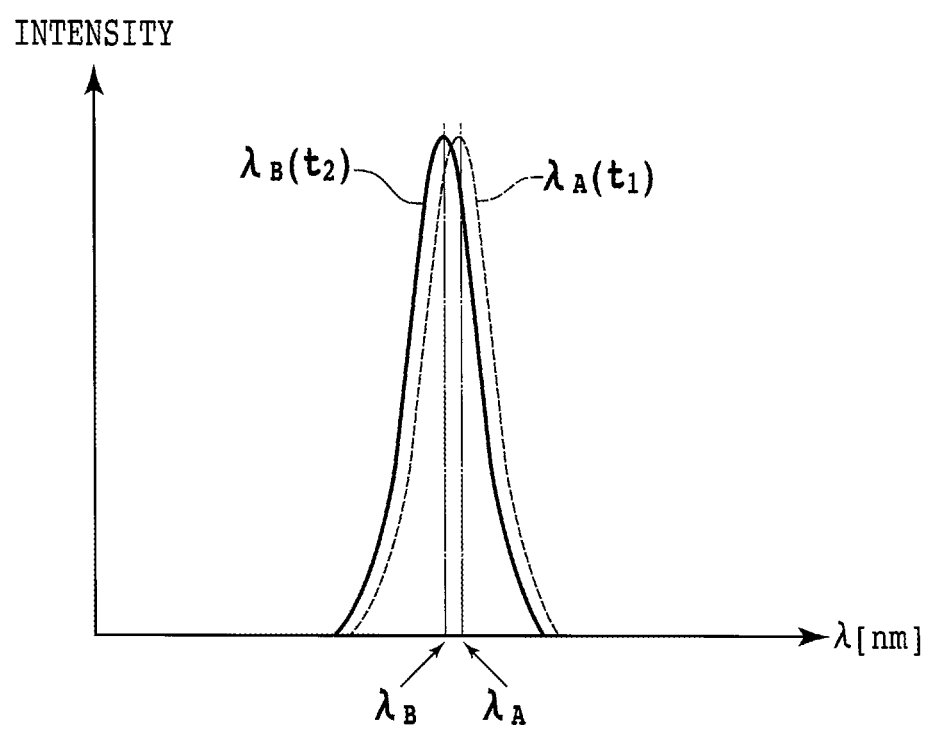
FIG. 3 is a diagram illustrating detected light signals by way of example.

FIG. 3 illustrates detected light times by way of example. In FIG. 3, a horizontal axis represents the wavelength λ(nm) and a vertical axis represents intensity of the detected light signals. A broken-line curve indicates a detected light signal having a peak wavelength $\lambda_A$ representing returning light 15 from the head 18a that is detected by the light detector 32 at time $t_1$. A solid-line curve indicates a detected light signal having a peak wavelength $\lambda_B$ representing returning light 15 from the head 18b that is detected by the light detector 32 at time $t_2$ different from the time $t_1$.

An associated relation between the peak wavelengths of returning light 15 and distances from the heads 18a and 18b to the converged spots is pre-registered in the controller 34. Therefore, the distances from the heads 18a and 18b to the upper surface 11a are determined depending on the peak wavelengths of the returning light 15. According to the present embodiment, the returning light 15 is detected at different timings depending on the heads 18a and 18b. Consequently, the height of the upper surface 11a, etc. can be measured without reducing a measurement wavelength band per head 18a or 18b and at two points using the two heads 18a and 18b. Note that the height of the upper surface 11a means a relative height with respect to a predetermined reference height. The predetermined reference height refers to the height of the holding surface 4a, for example. The thickness 11c (see FIG. 1) of the measurand 11 can be measured when the controller 34 calculates the difference between the height of the holding surface 4a and the height of the upper surface 11a.

Incidentally, the controller 34 stores peak wavelengths of the returning light 15 that correspond to respective measurement timings. For example, while alternately opening and closing the shutters 36a and 36b, the controller 34 stores peak wavelengths of the returning light 15 that correspond to respective timings of the opening of the shutters 36a and 36b. The height of the upper surface 11a is measured on the basis of the stored peak wavelengths. According to an example, the heads 18a and 18b are positioned in an array on a radius established on the upper surface 11a of the measurand 11 held on the holding surface 4a. While the shutters 36a and 36b are being alternately opened and closed, the chuck table 4 is rotated about its own central axis by the rotary actuator. In this manner, the height of the upper surface 11a can be measured in a concentric area on the upper surface 11a.

A display monitor, not illustrated, may be electrically connected to the controller 34. The display monitor displays an outline of the upper surface 11a and pieces of information representing the heights of measured points on the upper surface 11a. Providing the display monitor displays color-coded pieces of information representing the heights of measured points, the operator can visually recognize surface irregularities of the upper surface 11a by seeing the displayed color-coded pieces of information on the display monitor.

(First Modification)

For the purpose of multi-point measurement, three or more measuring optical fibers may be branched from the branching member 14. For example, three measuring optical fibers are branched from the branching member 14 and connected to respective heads. In this case, the controller 34 controls the shutter device 36 to apply measuring light 13 selectively from the three heads successively one at a time to the upper surface 11a of the measurand 11.

(Second Modification)

Figure 4:
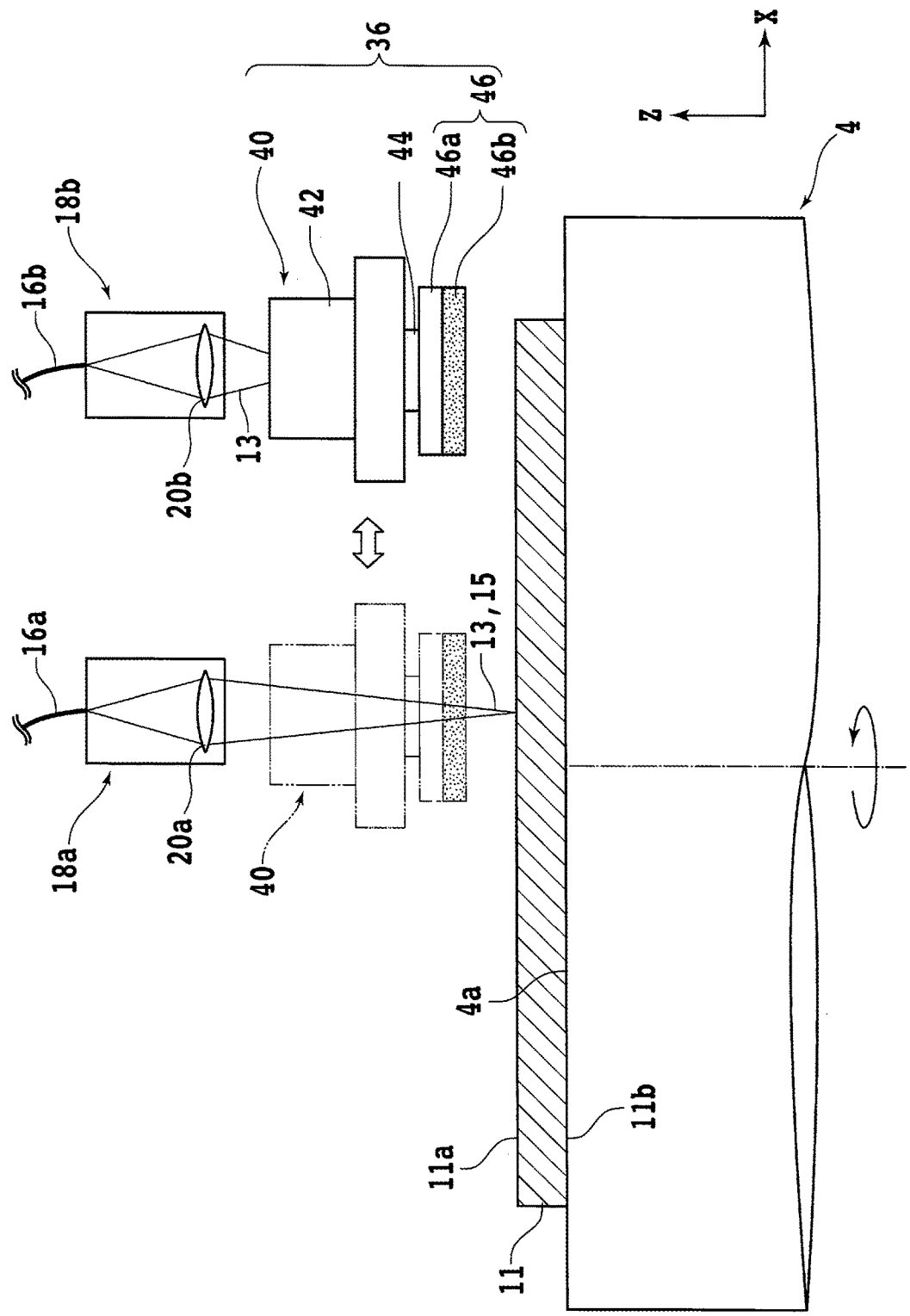
FIG. 4 is a schematic view illustrating a modified shutter device.

A second modification will be described below with reference to FIG. 4. FIG. 4 illustrates a modified shutter device 36 according to the second modification. According to the second modification, the shutter device 36 includes a single polishing unit 40. The polishing unit 40 has a spindle housing 42 in the form of a substantially hollow cylinder whose axis extends along the Z-axis directions. An X-axis moving mechanism, not illustrated, for moving the polishing unit 40 along the X-axis directions is coupled to the spindle housing 42.

A cylindrical spindle 44 has a portion rotatably housed in the spindle housing 42. A rotary actuator, not illustrated, such as an electric motor, is connected to an upper end of the spindle 44 in the spindle housing 42. The spindle 44 has a lower end coupled to a disk-shaped polishing tool 46. The polishing tool 46 is smaller in diameter than the holding surface 4a. For example, the diameter of the polishing tool 46 ranges from ⅒ to approximately ½ of the diameter of the holding surface 4a. The polishing tool 46 has a disk-shaped mount 46a made of metal. The mount 46a has a lower surface to which a polishing pad 46b having substantially the same diameter as the mount 46a is fixed.

The X-axis moving mechanism moves the polishing unit 40 along the X-axis directions selectively to a first position between the upper surface 11a and the head 18a and a second position between the upper surface 11a and the head 18b, thereby selectively blocking the measuring light 13 from the heads 18a and 18b. Therefore, the light detector 32 can detect the returning light 15 at different timings depending on the heads 18a and 18b, as with the first embodiment. In addition, with the heads 18a and 18b positioned in an array on a radius established on the upper surface 11a, while the polishing unit 40 is selectively blocking the measuring light 13 from the heads 18a and 18b, the chuck table 4 is rotated about its own central axis by the rotary actuator. In this manner, the height of the upper surface 11a can be measured in a concentric area on the upper surface 11a.

(Third Modification)

According to a third modification, the light source 8, the head 18a, and the spectroscopic unit 24 may be interconnected by a first three-port optical circulator, not illustrated, and the light source 8, the head 18b, and the spectroscopic unit 24 may be interconnected by a second three-port optical circulator, not illustrated. In this case, the first and second three-port optical circulators correspond to the branching member 14. An optical fiber interconnecting a first port of the first three-port optical circulator and the light source 8 and an optical fiber interconnecting a first port of the second three-port optical circulator and the light source 8 correspond to the first optical fiber 12. Moreover, an optical fiber interconnecting a third port of the first three-port optical circulator and the spectroscopic unit 24 and an optical fiber interconnecting a third port of the second three-port optical circulator and the spectroscopic unit 24 correspond to the second optical fiber 22.

(Fourth Modification)

According to a fourth modification, a first port of a 1×2 fiber optic coupler, not illustrated, may be connected to the light source 8, a first port of a first three-port optical circulator, not illustrated, may be connected to a second port of the 1×2 fiber optic coupler, and a first port of a second three-port optical circulator, not illustrated, may be connected to a third port of the 1×2 fiber optic coupler. The head 18a may be connected to a second port of the first three-port optical circulator, and the spectroscopic unit 24 may be connected to a third port of the first three-port optical circulator. Furthermore, the head 18b may be connected to a second port of the second three-port optical circulator, and the spectroscopic unit 24 may be connected to a third port of the second three-port optical circulator.

In this case, the first port of the 1×2 fiber optic coupler corresponds to one end of the first optical fiber 12, and the third port of the first three-port optical circulator and the third port of the second three-port optical circulator correspond to one end of the second optical fiber 22. According to the third and fourth modifications, the shutter device 36 and the polishing unit 40 are used to shift the timings of the application of the measuring light 13 from the heads 18a and 18b to the upper surface 11a, so that the returning light 15 from the heads 18a and 18b can be detected by the light detector 32 at different timings.

Second Embodiment

Figure 5:
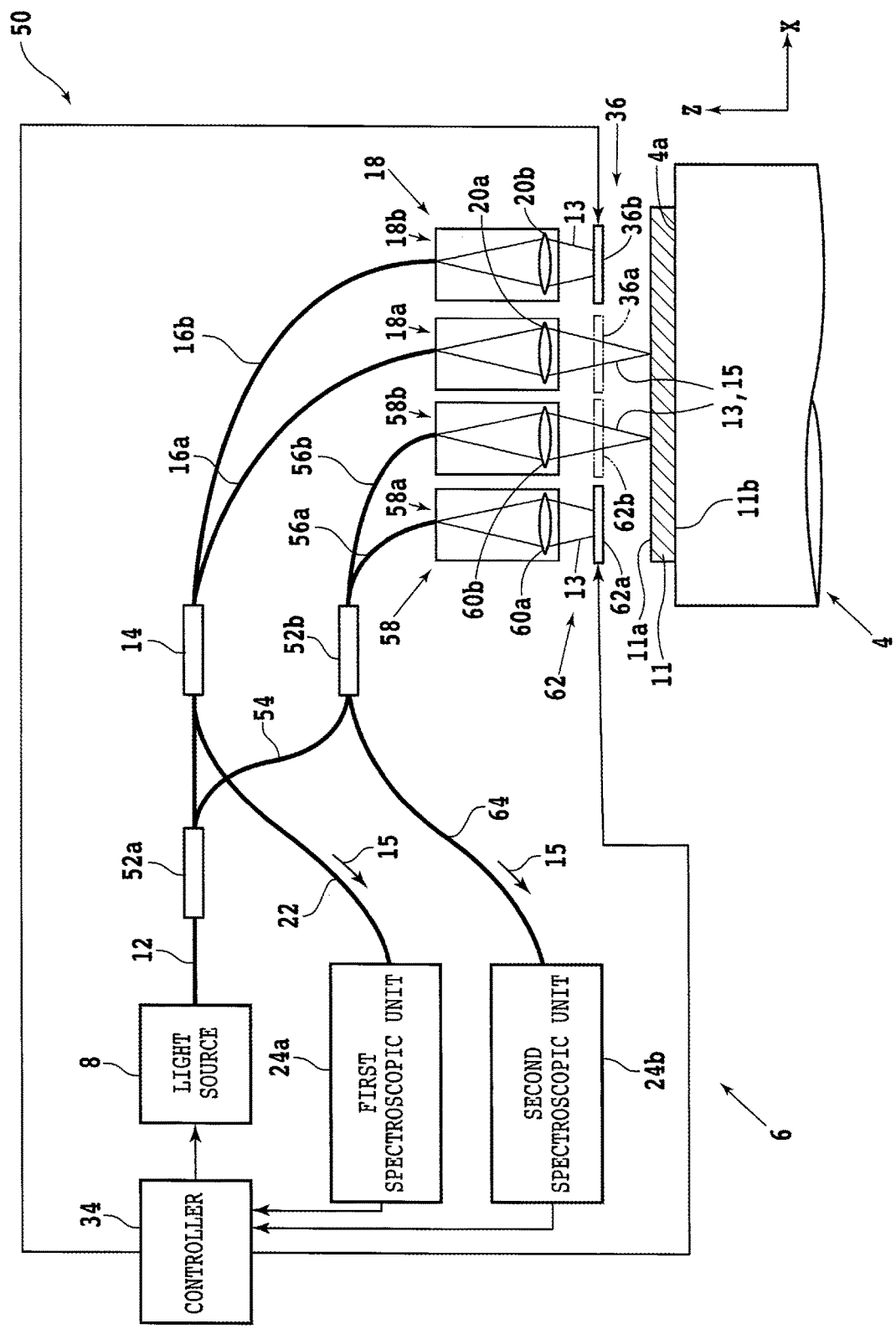
FIG. 5 is a schematic view of a measuring apparatus according to a second embodiment of the present invention.

A second embodiment of the present invention will be described below with reference to FIG. 5. FIG. 5 schematically illustrates a measuring apparatus 50 according to the second embodiment. The measuring apparatus 50 is mainly different from the measuring apparatus 2 according to the first embodiment in that it has a plurality of spectroscopic units 24, i.e., a first spectroscopic unit 24a and a second spectroscopic unit 24b. A 1×2 fiber optic coupler having an additional branching member 52a is connected between the light source 8 and the branching member 14. A first port of the 1×2 fiber optic coupler corresponds to one end of the first optical fiber 12 that transmits light from the light source 8.

The 1×2 fiber optic coupler has a second port and a third port that are connected to a side of the additional branching member 52a that is opposite the first optical fiber 12. The second port is connected to the branching member 14, and the third port is connected to a second branching member 52b. Therefore, light emitted from the light source 8 is branched from the additional branching member 52a to the branching member 14 and is also branched from the additional branching member 52a to the second branching member 52b via a third optical fiber 54.

As with the first embodiment, two measuring optical fibers 16a and 16b are connected to the branching member 14. The head 18a is connected to the measuring optical fiber 16a, and the head 18b is connected to the measuring optical fiber 16b. The shutter device 36 is disposed between the heads 18a and 18b and the holding surface 4a. Returning light 15 from the heads 18a and 18b is detected by the light detector 32 of the first spectroscopic unit 24a, which is of the same structure as the spectroscopic unit 24, via the branching member 14.

Similarly, two measuring optical fibers 56a and 56b are connected to the second branching member 52b. A head, i.e., a second head, 58a having a beam condenser 60a similar to the beam condenser 20a is connected to the measuring optical fiber 56a. Furthermore, a head, i.e., a second head, 58b having a beam condenser 60b similar to the beam condenser 20b is connected to the measuring optical fiber 56b. Incidentally, in the present invention, the head 58a and the head 58b jointly make up a second head unit 58.

The heads 58a and 58b have the same function as the heads 18a and 18b. Furthermore, a shutter 62a is disposed between the head 58a and the holding surface 4a, and a shutter 62b is disposed between the head 58b and the holding surface 4a. As with the shutter device 36, the shutters 62a and 62b, which jointly make up a second shutter device 62, are controlled by the controller 34. The shutters 36a, 36b, 62a, and 62b are slidable along the Y-axis directions, though they may be slidable along predetermined directions other than the Y-axis directions in the X-Y plane.

The second shutter device 62 shifts the timings of the application of the measuring light 13 from the heads 58a and 58b to the upper surface 11a of the measurand 11. The returning light 15 reflected by the upper surface 11a is transmitted successively through the heads 58a and 58b, the measuring optical fibers 56a and 56b, and the second branching member 52b to a fourth optical fiber 64. The fourth optical fiber 64 is branched from the second branching member 52b differently from the third optical fiber 54. The returning light 15 is transmitted via the fourth optical fiber 64 to the second spectroscopic unit 24b.

As with the first spectroscopic unit 24a (see FIG. 2), the second spectroscopic unit 24b has a collimator lens 26, a diffraction grating 28, a condensing lens 30, and a light detector, i.e., a second light detector, 32. According to the second embodiment, the first spectroscopic unit 24a detects the returning light 15 from the heads 18a and 18b individually at different timings and the second spectroscopic unit 24b detects the returning light 15 from the heads 58a and 58b individually at different timings.

Consequently, the height of the upper surface 11a, etc. can be measured without reducing a measurement wavelength band per head and at four points using the four heads 18a, 18b, 58a, and 58b. Incidentally, according to the second embodiment, the four heads 18a, 18b, 58a, and 58b may be arrayed on a radius established on the upper surface 11a. In addition, the first through fourth modifications described above may be applied to the second embodiment.

Third Embodiment

Figure 6:
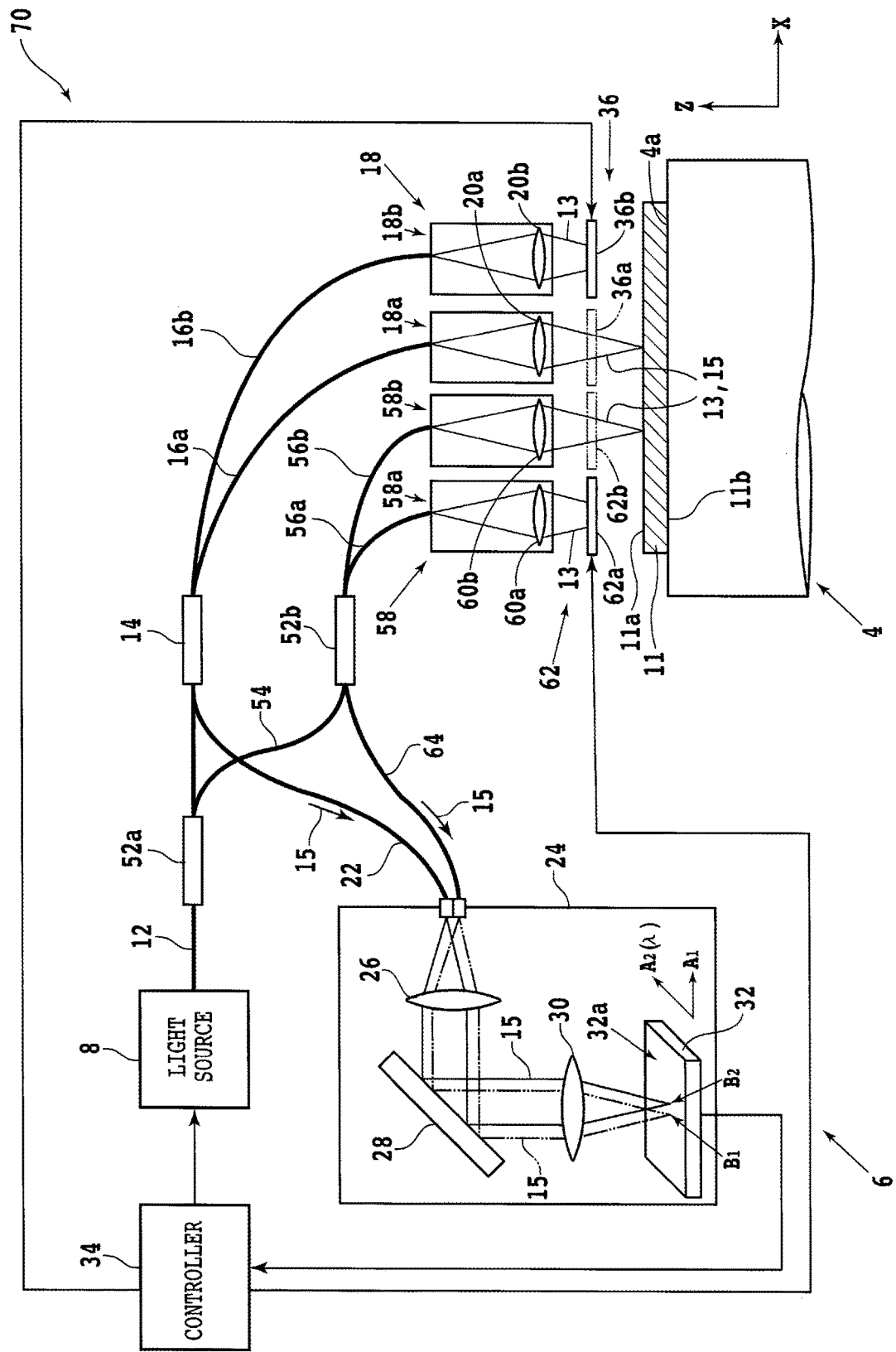
FIG. 6 is a schematic view of a measuring apparatus according to a third embodiment of the present invention.

A third embodiment of the present invention will be described below with reference to FIG. 6. FIG. 6 schematically illustrates a measuring apparatus 70 according to the third embodiment. The measuring apparatus 70 is mainly different from the measuring apparatus 50 according to the second embodiment in that it has a single spectroscopic unit 24. The returning light 15 from the first head unit 18 is transmitted through the second optical fiber 22 to the spectroscopic unit 24, and the returning light 15 from the second head unit 58 is transmitted through the fourth optical fiber 64 to the spectroscopic unit 24.

However, because the positions where light from the second optical fiber 22 and light from the fourth optical fiber 64 fall on the collimator lens 26 are different from each other, the returning light 15 from the first head unit 18 and the returning light 15 from the second head unit 58 are detected by the light detector 32 at different positions in the first direction $A_1$ on the light detecting area 32a. In FIG. 6, the returning light 15 from the first head unit 18 is detected at a position $B_1$ on the light detecting area 32a, and the returning light 15 from the second head unit 58 is detected at a position $B_2$, different from the position $B_1$, on the light detecting area 32a. Furthermore, the returning light 15 is detected by the light detector 32 at different positions in the second direction $A_2$ on the light detecting area 32a depending on the wavelength thereof.

In this manner, the returning light 15 is detected on the light detecting area 32a separately with respect to the head units. According to the third embodiment, the number of spectroscopic units may be reduced compared with the second embodiment. The height of the upper surface 11a, etc. can be measured without reducing a measurement wavelength band per head and at four points using the four heads 18a, 18b, 58a, and 58b. Incidentally, according to the third embodiment, the four heads 18a, 18b, 58a, and 58b may be arrayed on a radius established on the upper surface 11a. In addition, the first through fourth modifications described above may be applied to the third embodiment.

Fourth Embodiment

Figure 7:
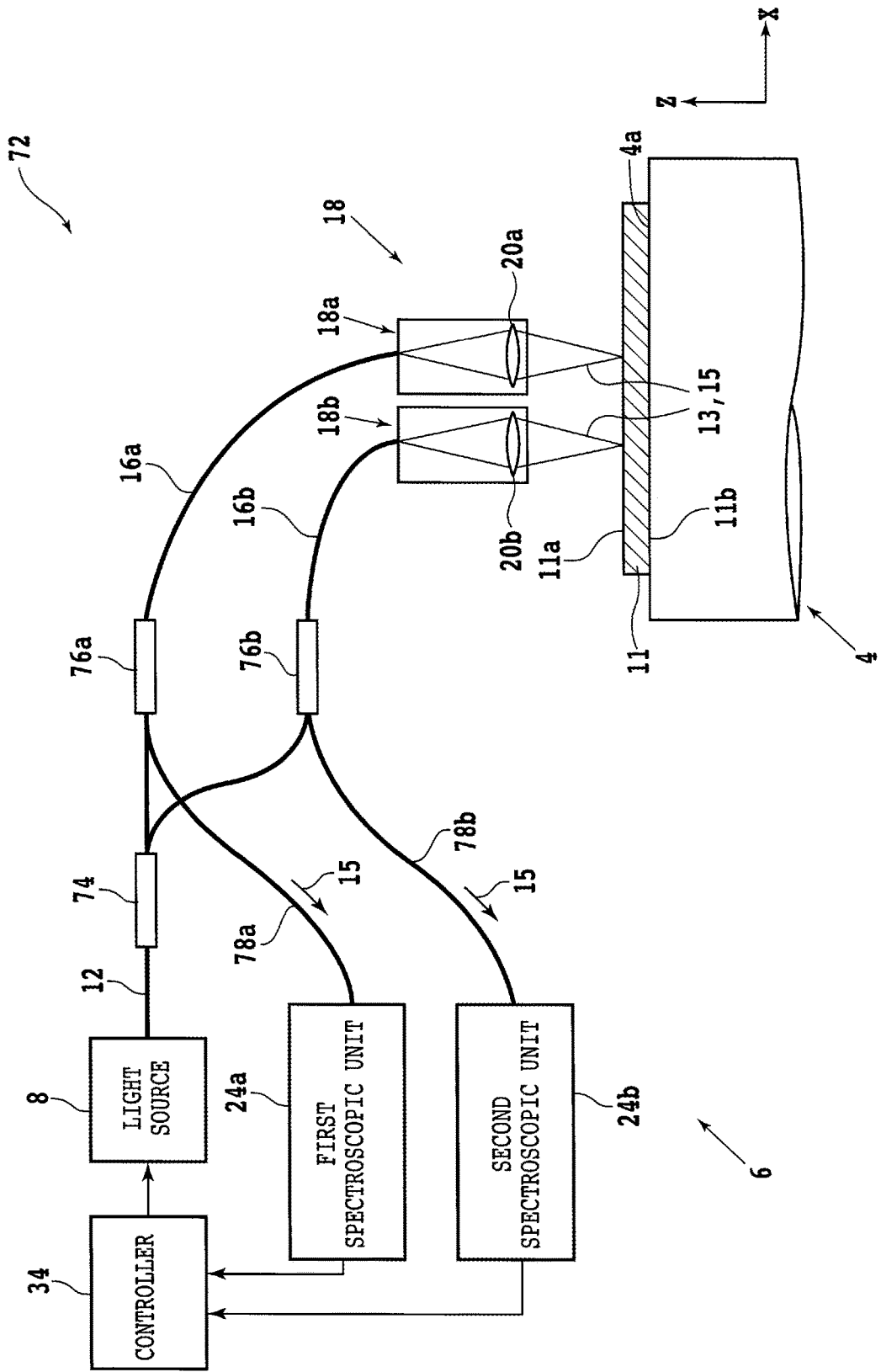
FIG. 7 is a schematic view of a measuring apparatus according to a fourth embodiment of the present invention.

A fourth embodiment of the present invention will be described below with reference to FIG. 7. FIG. 7 schematically illustrates a measuring apparatus 72 according to the fourth embodiment. The measuring apparatus 72 is mainly different from the measuring apparatus 50 according to the second embodiment illustrated in FIG. 5 in that it does not have the shutter device 36, the second shutter device 62, and the first and second heads 58a and 58b. Light emitted from the light source 8 is transmitted through the first optical fiber 12 to a light-source-side branching member 74, which branches the light to at least two head-side branching members, i.e., combiners, 76a and 76b.

Each of the light-source-side branching member 74 and the head-side branching members 76a and 76b includes a 1×2 fiber optic coupler. The head 18a is connected to the head-side branching member 76a through the measuring optical fiber 16a. Similarly, the head 18b is connected to the head-side branching member 76b through the measuring optical fiber 16b. The head-side branching members 76a and 76b transmit the light branched by the light-source-side branching member 74 to the corresponding measuring optical fibers 16a and 16b, respectively.

According to the present embodiment, no shutter device 36 is disposed between the heads 18a and 18b, i.e., the head unit, and the holding surface 4a. Therefore, the light transmitted through the measuring optical fibers 16a and 16b is applied to the measurand 11 held on the holding surface 4a without being blocked by the shutters 36a and 36b, etc. The returning light 15 reflected by the upper surface 11a of the measurand 11 is transmitted through the measuring optical fiber 16a and a spectroscopic-unit-side optical fiber 78a branched from the head-side branching member 76a to the first spectroscopic unit 24a.

Likewise, the returning light 15 reflected by the upper surface 11a of the measurand 11 is transmitted through the measuring optical fiber 16b and a spectroscopic-unit-side optical fiber 78b branched from the head-side branching member 76b to the second spectroscopic unit 24b. In this fashion, the light applied from the heads 18a and 18b is reflected by the upper surface 11a and detected individually by the light detectors 32 of the first and second spectroscopic units 24a and 24b. Consequently, the height of the upper surface 11a, etc. can be measured without reducing a measurement wavelength band per head 18a or 18b and at two points using the two heads 18a and 18b. Note that providing a measuring apparatus includes a plurality of sets including three or more sets of head-side branching members, measuring optical fibers, heads, spectroscopic-unit-side optical fibers, and spectroscopic units, the measuring apparatus can measure the height of the upper surface 11a, etc. at a plurality of points including three or more points.

Fifth Embodiment

Figure 8:
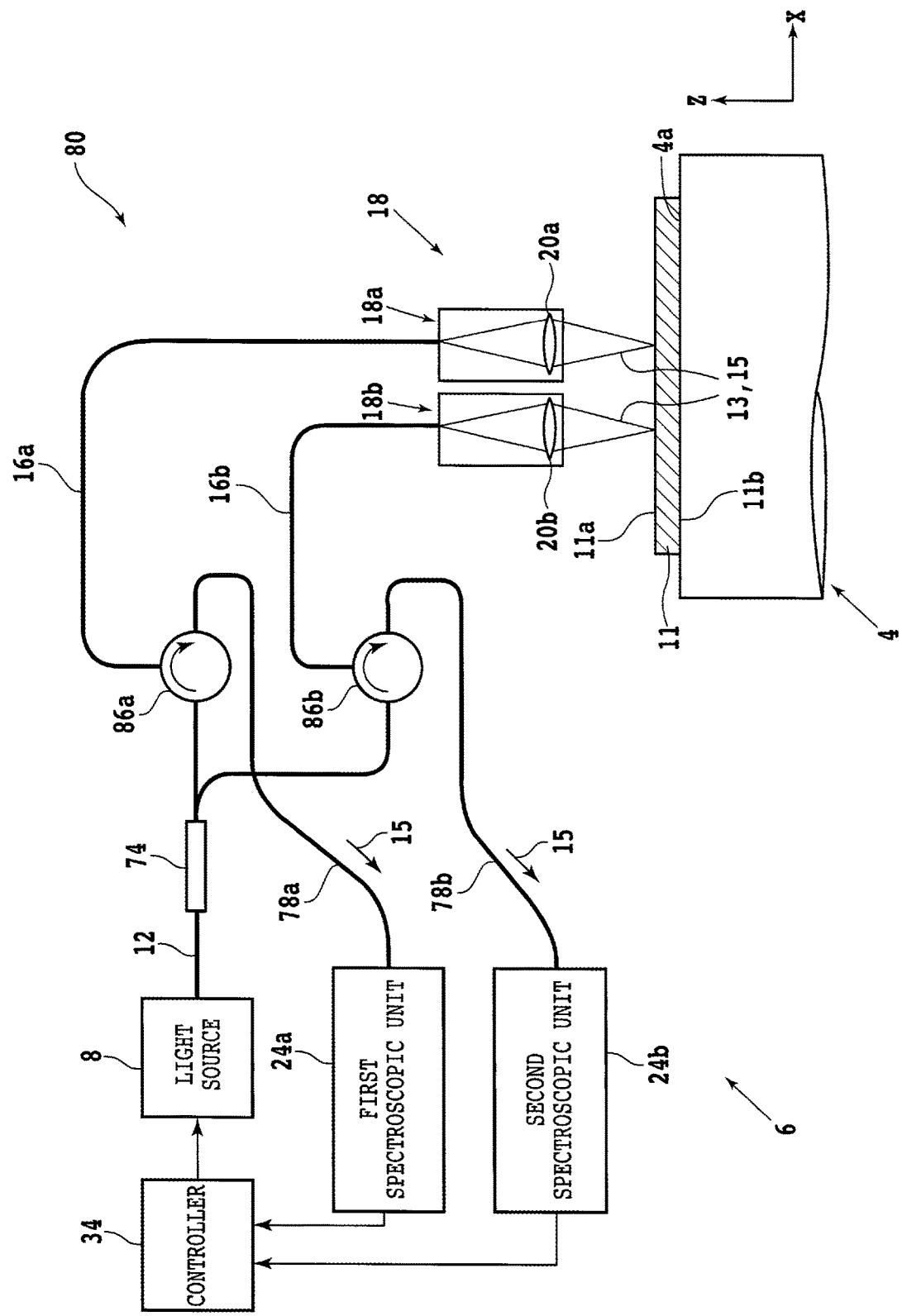
FIG. 8 is a schematic view of a measuring apparatus according to a fifth embodiment of the present invention.

A fifth embodiment of the present invention will be described below with reference to FIG. 8. FIG. 8 schematically illustrates a measuring apparatus 80 according to the fifth embodiment. The measuring apparatus 80 is different from the measuring apparatus 72 illustrated in FIG. 7 in that the head-side branching members 76a and 76b illustrated in FIG. 7 are replaced with three-ports optical circulators, i.e., combiners, 86a and 86b, respectively. The optical circulator 86a has a first port connected to the light source 8 through the light-source-side branching member 74 and the first optical fiber 12. Furthermore, the optical circulator 86a has a second port connected to the measuring optical fiber 16a and a third port connected to the spectroscopic-unit-side optical fiber 78a.

Similarly, the optical circulator 86b has a first port connected to the light source 8 through the light-source-side branching member 74 and the first optical fiber 12. Furthermore, the optical circulator 86b has a second port connected to the measuring optical fiber 16b and a third port connected to the spectroscopic-unit-side optical fiber 78b. According to the present embodiment, since a loss of the amount of the returning light 15 that is detected by the first and second spectroscopic units 24a and 24b is smaller than if the head-side branching members 76a and 76b are used, the light from the light source 8 can be used more effectively.

The structural details, processes, and other features according to the above embodiments and modifications may be changed or modified appropriately without departing from the scope of the present invention. For example, the above embodiments and modifications remain effective and functional even if the head 18a is of an interference optical system. Specifically, the head includes a condensing lens free of axial chromatic aberrations and provides a first optical path along which the measuring light 13 travels through the condensing lens and a second optical path along which the measuring light 13 travels around the condensing lens (see, for example, Japanese Patent Laid-Open No. 2011-122894). When interference light produced from returning light 15 that has traveled along the first optical path through the condensing lens and measuring light 13 that has traveled along the second optical path is detected by the light detector 32, the distance from the head to the upper surface 11a can be measured on the basis of the peak wavelength of the interference light and the difference between the lengths of the first and second optical paths.

Incidentally, according to another modification, a fiber optic combiner, not illustrated, having a beam splitter and a plurality of sets of lenses and optical fibers may be used instead of a fiber optic coupler, e.g., the fiber optic coupler 10 (see FIG. 1) including the branching member 14 and the plural optical fibers.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A measuring apparatus comprising:
a holding unit for holding a measurand on a holding surface of a rotatable chuck table; and
a measuring unit for measuring a height of an upper surface of the measurand held by the holding unit or a thickness of the measurand held by the holding unit, wherein the measuring unit includes:
a light source for emitting light in a predetermined wavelength band,
a first optical fiber for transmitting the light emitted from the light source,
a branching member for branching the light transmitted by the first optical fiber to at least two measuring optical fibers,
a head unit having a plurality of heads including respective beam condensers for converging the light branched by the branching member onto the measurand,
a shutter device for shifting timings of application of the light from the heads to the measurand, wherein the shutter device includes a shutter associated with each of the heads, positioned between the associated head and the holding surface of the holding unit when in a closed position,
a second optical fiber branched from the branching member, for transmitting returning light reflected from the measurand and transmitted through the measuring optical fibers,
a spectroscopic unit having a light detector for detecting the returning light transmitted through the second optical fiber, and
a controller for controlling operation of the shutter device to control the timings of application of the light from the heads to the measurand, while the chuck table is being rotated, and for controlling the light detector to detect the returning light from the heads individually.

2. The measuring apparatus according to claim 1, wherein the light detector includes a two-dimensional sensor.

3. The measuring apparatus according to claim 1, wherein each of said shutters comprises a lens shutter that is slidable along a predetermined direction to selectively block the light from the associated head.

4. The measuring apparatus according to claim 1, wherein each of said shutters comprises a transmissive liquid crystal that selectively transmits and blocks light when electrically driven.

5. The measuring apparatus according to claim 1, wherein each of said shutters comprises a polishing unit that includes a rotatable polishing pad, and further wherein each polishing unit is configured and arranged to be moved to selectively block the light from its associated head.

6. The measuring apparatus according to claim 1, wherein the measurand comprises a silicon wafer.

7. The measuring apparatus according to claim 1, wherein the rotatable motor is configured and arranged to be rotatable via an electric motor.

8. A measuring apparatus comprising:
a holding unit for holding a measurand, and
a measuring unit for measuring a height of an upper surface of the measurand held by the holding unit or a thickness of the measurand held by the holding unit, wherein the measuring unit includes:
a light source for emitting light in a predetermined wavelength band,
a first optical fiber for transmitting the light emitted from the light source,
a branching member for branching the light transmitted by the first optical fiber to at least two measuring optical fibers,
a head unit having a plurality of heads including respective beam condensers for converging the light branched by the branching member onto the measurand,
a shutter device for shifting timings of application of the light from the heads to the measurand,
a second optical fiber branched from the branching member, for transmitting returning light reflected from the measurand and transmitted through the measuring optical fibers,
a spectroscopic unit having a light detector for detecting the returning light transmitted through the second optical fiber, and
a controller for controlling operation of the shutter device to control the timings of application of the light from the heads to the measurand and controlling the light detector to detect the returning light from the heads individually, and
wherein the measuring apparatus further comprises:
an additional branching member disposed between the first optical fiber and the branching member;
a second branching member for branching light from the additional branching member to at least two different measuring optical fibers;
a second head unit having a plurality of second heads including respective beam condensers for converging the light branched by the second branching member onto the measurand;
a second shutter device for shifting timings of application of the light from the second heads to the measurand;
a fourth optical fiber branched from the second branching member differently from a third optical fiber that interconnects the additional branching member and the second branching member, for transmitting the returning light reflected by the measurand and transmitted through the measuring optical fibers; and
a second spectroscopic unit having a second light detector for detecting the returning light transmitted through the fourth optical fiber,
wherein the controller controls operation of the second shutter device to control the timings of application of the light from the second heads to the measurand and controlling the second light detector to detect the returning light from the second heads individually.

9. A measuring apparatus comprising:
a holding unit for holding a measurand; and
a measuring unit for measuring a height of an upper surface of the measurand held by the holding unit or a thickness of the measurand held by the holding unit, wherein the measuring unit includes:
a light source for emitting light in a predetermined wavelength band,
a first optical fiber for transmitting the light emitted from the light source,
a branching member for branching the light transmitted by the first optical fiber to at least two measuring optical fibers,
a head unit having a plurality of heads including respective beam condensers for converging the light branched by the branching member onto the measurand, a shutter device for shifting timings of application of the light from the heads to the measurand, a second optical fiber branched from the branching member, for transmitting returning light reflected from the measurand and transmitted through the measuring optical fibers, a spectroscopic unit having a light detector for detecting the returning light transmitted through the second optical fiber, and a controller for controlling operation of the shutter device to control the timings of application of the light from the heads to the measurand and controlling the light detector to detect the returning light from the heads individually, wherein the measuring apparatus further comprises:

an additional branching member disposed between the first optical fiber and the branching member;

a second branching member for branching light from the additional branching member to at least two different measuring optical fibers;

a second head unit having a plurality of second heads including respective beam condensers for converging the light branched by the second branching member onto the measurand;

a second shutter device controllable in operation by the controller, for shifting timings of application of the light from the second heads to the measurand; and a fourth optical fiber branched from the second branching member with respect to a third optical fiber that interconnects the additional branching member and the second branching member, for transmitting the returning light reflected by the measurand and transmitted through the measuring optical fibers, wherein the returning light transmitted through the second optical fiber and the fourth optical fiber is detected by the light detector, wherein the light detector has a two-dimensional sensor, and wherein the two-dimensional sensor detects the returning light transmitted through the second optical fiber and the returning light transmitted through the fourth optical fiber at different positions, thereby separating the returning light transmitted through the second optical fiber and the returning light transmitted through the fourth optical fiber from each other.

10. A measuring apparatus comprising:

a holding unit for holding a measurand; and a measuring unit for measuring a height of an upper surface of the measurand held by the holding unit or a thickness of the measurand held by the holding unit, wherein the measuring unit includes:

a light source for emitting light in a predetermined wavelength band, a first optical fiber for transmitting the light emitted from the light source, a light-source-side branching member for branching the light transmitted by the first optical fiber to at least two rays of light, wherein an input side of the light-source-side branching member is configured and arranged for receiving only a single input and an output side of the light-source-side branching member is configured and arranged for outputting light to a plurality of outputs, a plurality of couplers for transmitting rays of light branched from the light-source-side branching member to respective measuring optical fibers, a head unit having a plurality of heads including respective beam condensers for converging the rays of light transmitted through the measuring optical fibers onto the measurand, a plurality of spectroscopic-unit-side optical fibers branched from the couplers, for transmitting returning light reflected from the measurand and transmitted through the measuring optical fibers, and a plurality of spectroscopic units associated with the respective spectroscopic-unit-side optical fibers and having respective light detectors for detecting the returning light transmitted through the respective spectroscopic-unit-side optical fibers.

11. The measuring apparatus according to claim 10, wherein each of the couplers is an optical circulator.

12. The measuring apparatus according to claim 10, wherein the holding surface is configured and arranged to be rotated while the controller is controlling operation of the shutter device.

13. The measuring apparatus according to claim 12, wherein the measurand comprises a silicon wafer.

14. The measuring apparatus according to claim 10, wherein the holding unit comprises a chuck table that is configured and arranged to be rotated via an electric motor.

* * * * *